US008418831B2

(12) United States Patent
Alexander et al.

(10) Patent No.: US 8,418,831 B2

(45) **Date of Patent: *Apr. 16, 2013**

(54) APPARATUS FOR TRANSPORTING FOOD PRODUCTS TO A LOADING HEAD

(75) Inventors: David W. Alexander, Boone, IA (US); Kevin J. Hansen, Des Moines, IA (US); Colin R. Hart, Ankeny, IA (US); Joshua W. Higgins, Pleasant Hill, IA (US)

(73) Assignee: Marel Meat Processing Inc., Des Moines, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/453,287

(22) Filed: Apr. 23, 2012

(65) Prior Publication Data

US 2012/0199441 A1 Aug. 9, 2012

Related U.S. Application Data

(60) Continuation of application No. 13/186,201, filed on Jul. 19, 2011, now Pat. No. 8,220,614, which is a division of application No. 12/090,698, filed as application No. PCT/US2006/029136 on Jul. 28, 2006, now Pat. No. 8,025, 142.

(60) Provisional application No. 60/596,779, filed on Oct. 20, 2005.

(51) Int. Cl.
*B65G 47/22* (2006.01)

(52) U.S. Cl.
USPC ................. 198/370.08; 198/479.1; 198/478.1

(58) Field of Classification Search ........................ None
See application file for complete search history.

(56) References Cited

U.S. PATENT DOCUMENTS

| | | | | |
|---|---|---|---|---|
| 2,570,198 | A | 10/1951 | Brager | |
| 2,948,093 | A | 8/1960 | Bonami | |
| 3,542,184 | A * | 11/1970 | Ruckman | 198/404 |
| 3,948,711 | A | 4/1976 | Piatek | |
| 4,057,138 | A | 11/1977 | Grebe | |
| 4,633,652 | A | 1/1987 | Dagenais et al. | |
| 5,123,518 | A | 6/1992 | Pfaff | |
| 6,371,279 | B2 * | 4/2002 | Le | 198/479.1 |

FOREIGN PATENT DOCUMENTS

| | | |
|---|---|---|
| CH | 688090 | 5/1997 |
| DE | 4032533 | 4/1992 |
| EP | 0456155 | 11/1991 |
| EP | 1238910 | 9/2002 |
| GB | 995291 | 6/1965 |

* cited by examiner

*Primary Examiner* — Kavel Singh

(74) *Attorney, Agent, or Firm* — Zarley Law Firm, P.L.C.

(57) ABSTRACT

An apparatus and method of transporting food products to a loading station having a cooling conveyor that selectively drops food product into a distributor. The distributor separates product into at least two lanes and drops product onto a conveyor. A balancing and diverting conveyor monitors and counts product in each lane and diverts product selectively based upon the sensed product. An orienter transfers product from a loading conveyor to a buffer conveyor. The buffer conveyor transfers product to a main conveyor which transfers product to a loading head.

13 Claims, 10 Drawing Sheets

46
48
50
10
52
52
56
56
56
56
58
58
60
60
62
62
66
106

114
117
114
119
117
116

122
123
118
123
10
68
124
120
126
72

APPARATUS FOR TRANSPORTING FOOD PRODUCTS TO A LOADING HEAD

CROSS REFERENCE TO A RELATED APPLICATION

This application is a continuation of U.S. Ser. No. 13/186,201 filed Jul. 19, 2011 now U.S. Pat. No. 8,220,614 which is a divisional application of Ser. No. 12/090,698 filed Apr. 30, 2008; now U.S. Pat. No. 8,025,142 which is based on PCT/US2006/029136 filed Jul. 28, 2006, which is based on Provisional application Ser. No. 60/596,779 filed Oct. 20, 2005.

BACKGROUND OF THE INVENTION

This invention is directed to an apparatus and method of transporting food products to a loading head and more specifically to an apparatus that processes a product without scrambling or losing its initial orientation.

Producing sausages, hot dogs, and the like via a co-extrusion system creates a tremendous volume of product per hour. Conveyor systems have been used in the past to transport food product from a cooling conveyor to a loading head. Problems exist with these current systems; for example, the product orientation is lost or scrambled. The product must be re-oriented which requires additional machinery. Also, damages to the product can occur in this process. By handling the product real time, process parameters can be maintained more closely. Also, packaging machinery requires time out of production for maintenance and replacement of spools of packaging film which affects volume. Accordingly, there is a need in the art for an apparatus and method that addresses these problems.

An objective of the invention is to provide an apparatus and method of transporting food product to a loading head from a cooling conveyor that is faster and more reliable.

Another objective of the invention is to provide an apparatus and method of transporting food product to a loading head where food product is separated into more than one lane.

A still further objective of this invention is to provide an apparatus and method that reduces the occurrence of shingles when transporting food product.

These and other objectives will be apparent to one skilled in the art based on the following disclosure.

SUMMARY OF THE INVENTION

An apparatus and method of transporting food products to a loading head having a cooling conveyor that selectively drops food product into a distributor. The distributor separates product into at least two lanes and drops product onto a conveyor. A balancing and diverting conveyor monitors and counts product in each lane and diverts product selectively based upon the sensed product. An orienter transfers product from a loading conveyor to a buffer conveyor. The buffer conveyor transfers product to a main conveyor which transfers product to a load head.

DETAILED DESCRIPTION OF THE PREFERRED EMBODIMENTS

Figure 1:
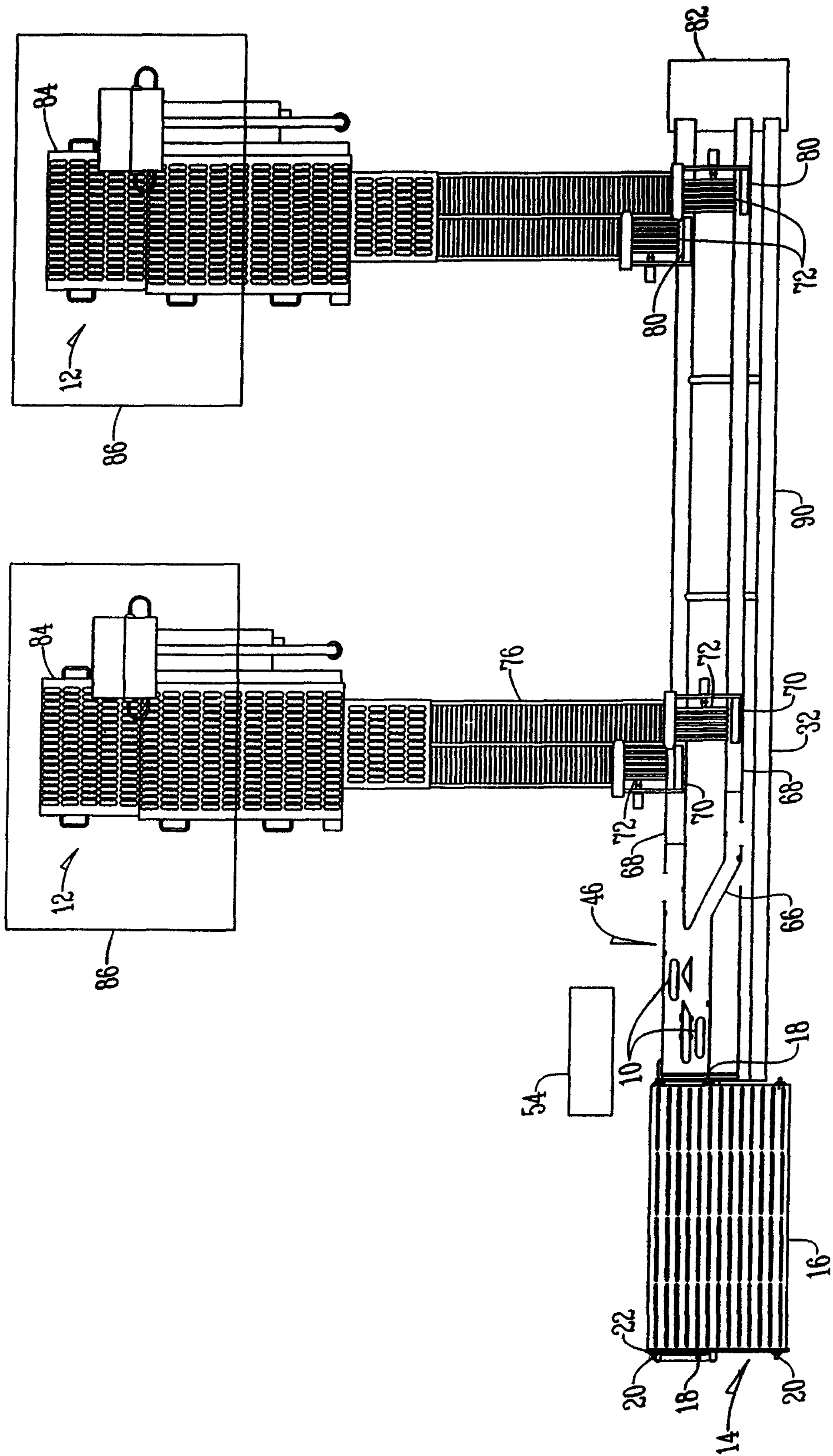
FIG. 1 is a top plan view of an apparatus for transporting food product.
Figure 2:
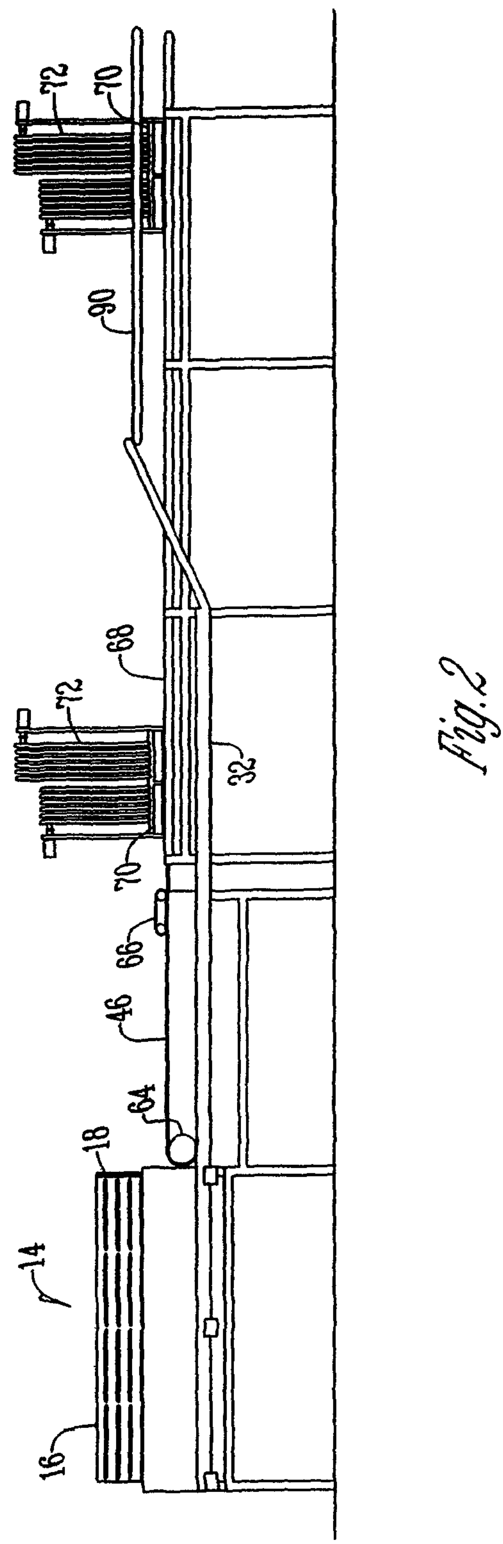
FIG. 2 is a side view of an apparatus for transporting food product.
Figure 3:
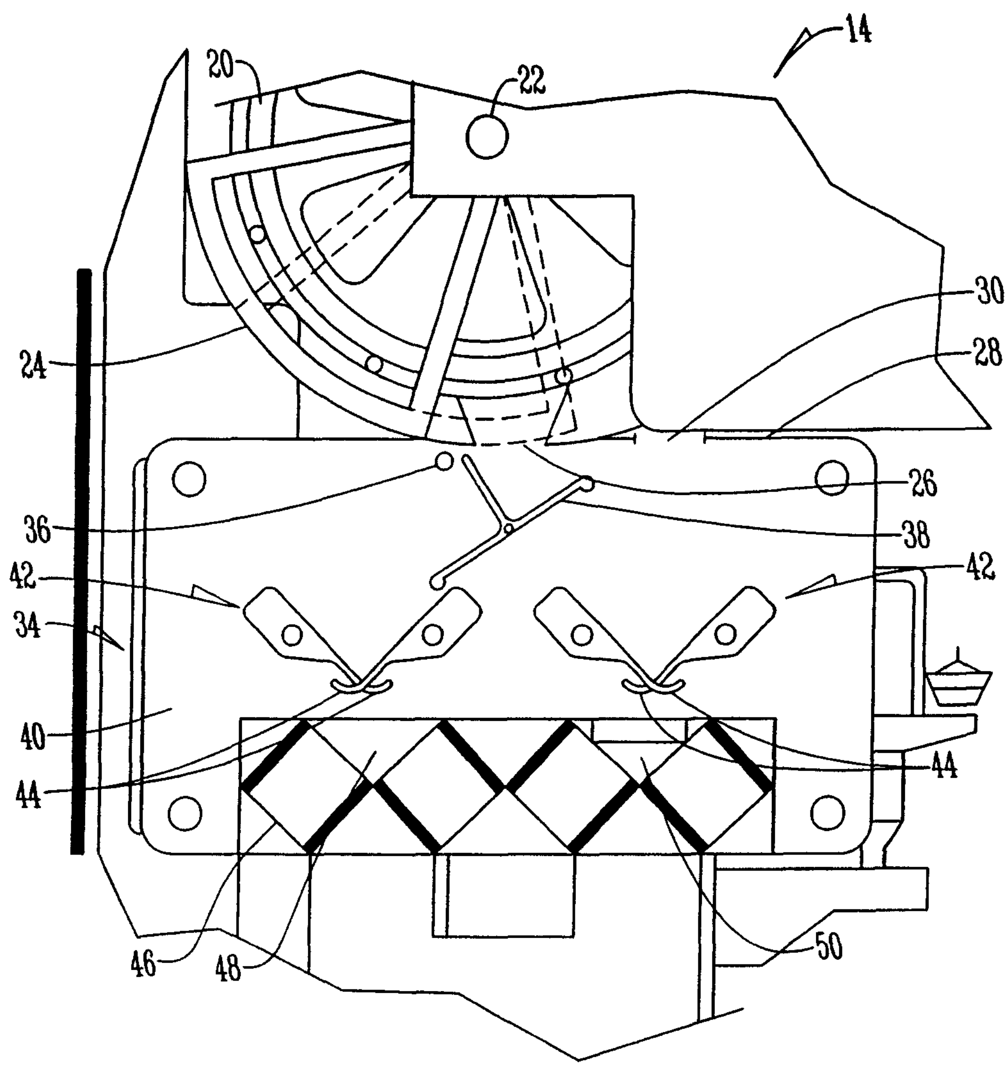
FIG. 3 is a partial end view of a distributor.
Figure 4:
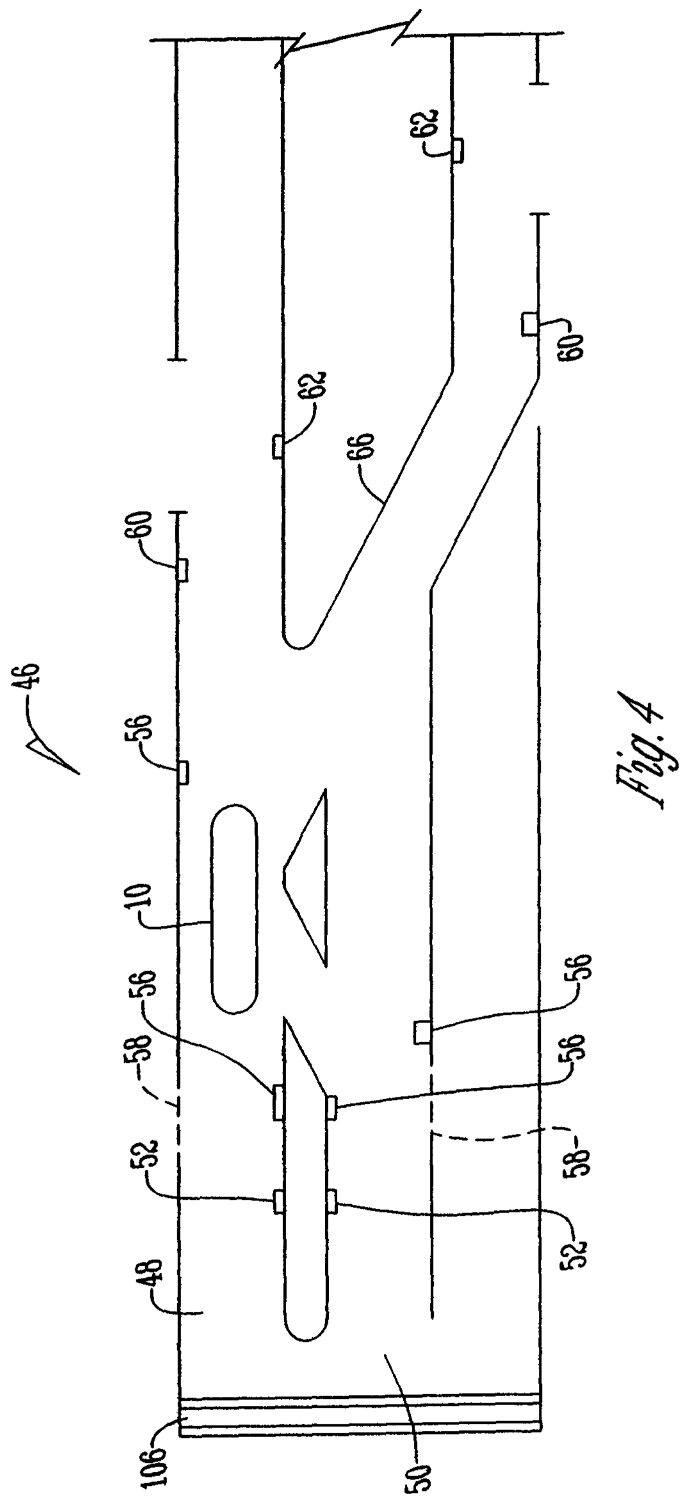
FIG. 4 is a top plan view of a balancing and diverting conveyor.
Figure 5:
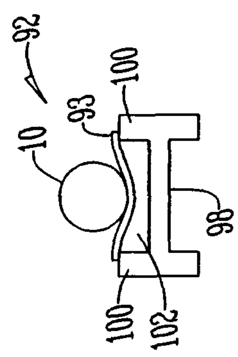
FIG. 5 is an end view of a V-conveyor.
Figure 6:
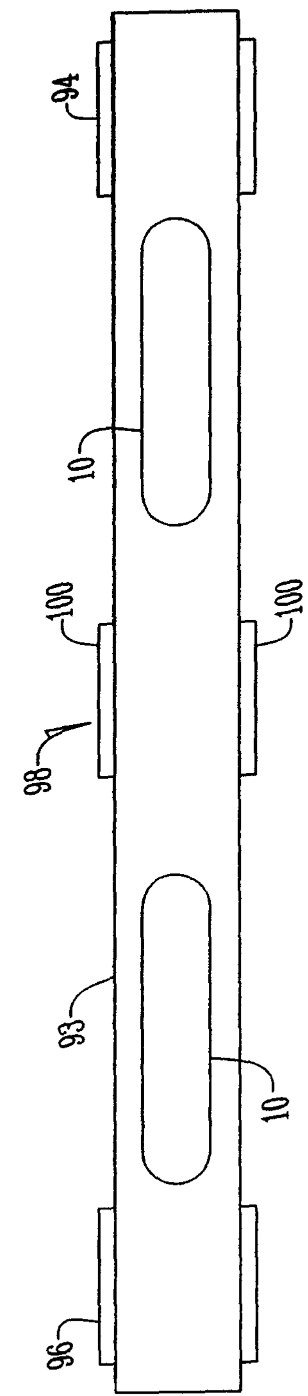
FIG. 6 is a top plan view of a V-conveyor.
Figure 7:
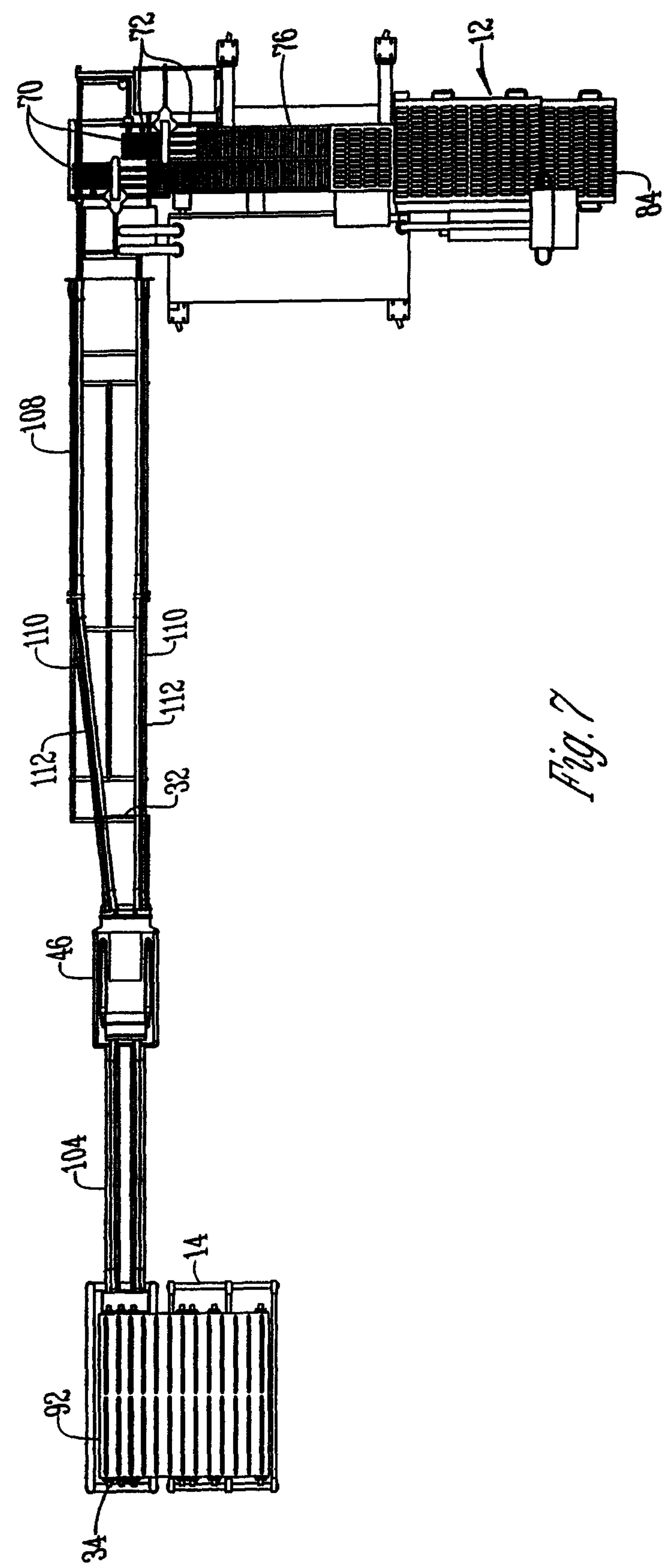
FIG. 7 is a top view of an apparatus for transporting food product.
Figure 8:
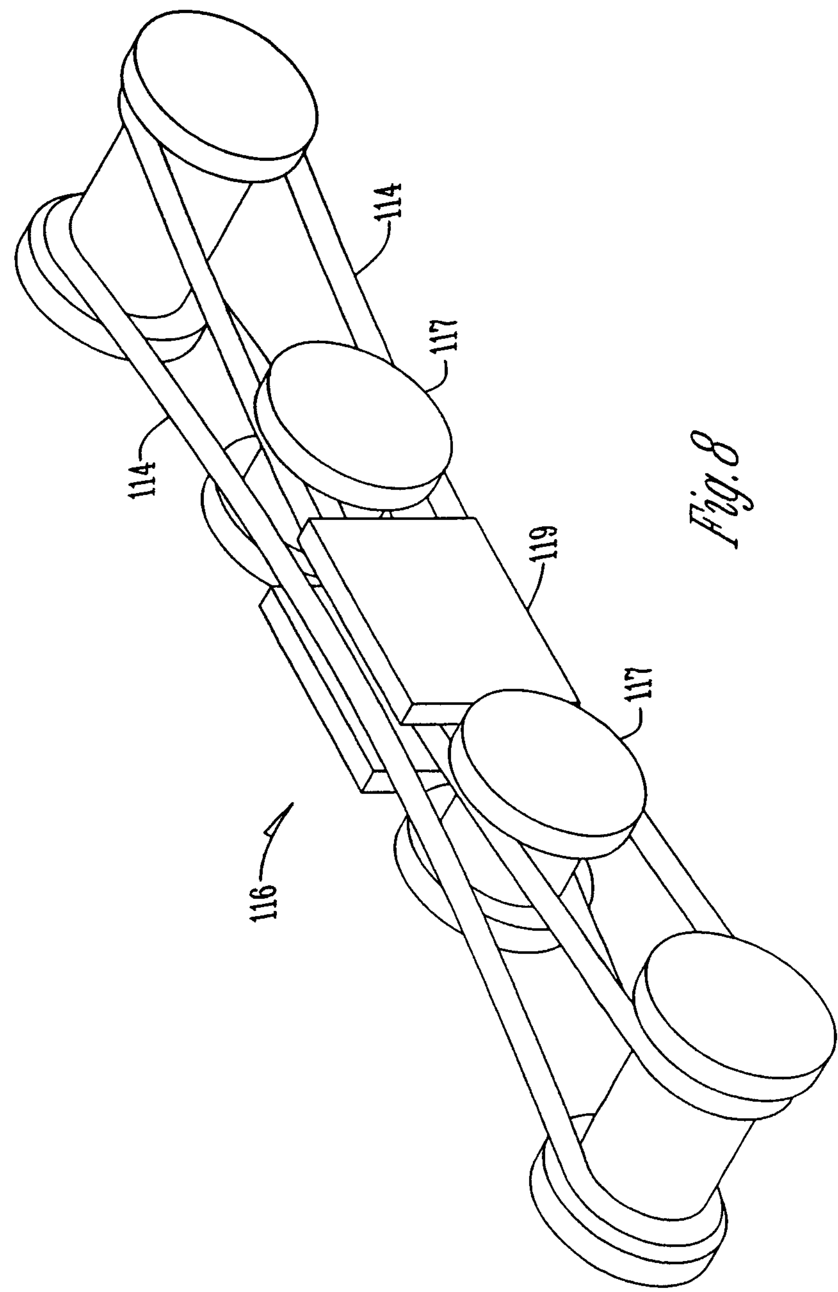
FIG. 8 is a perspective view of a loading conveyor.
Figure 9:
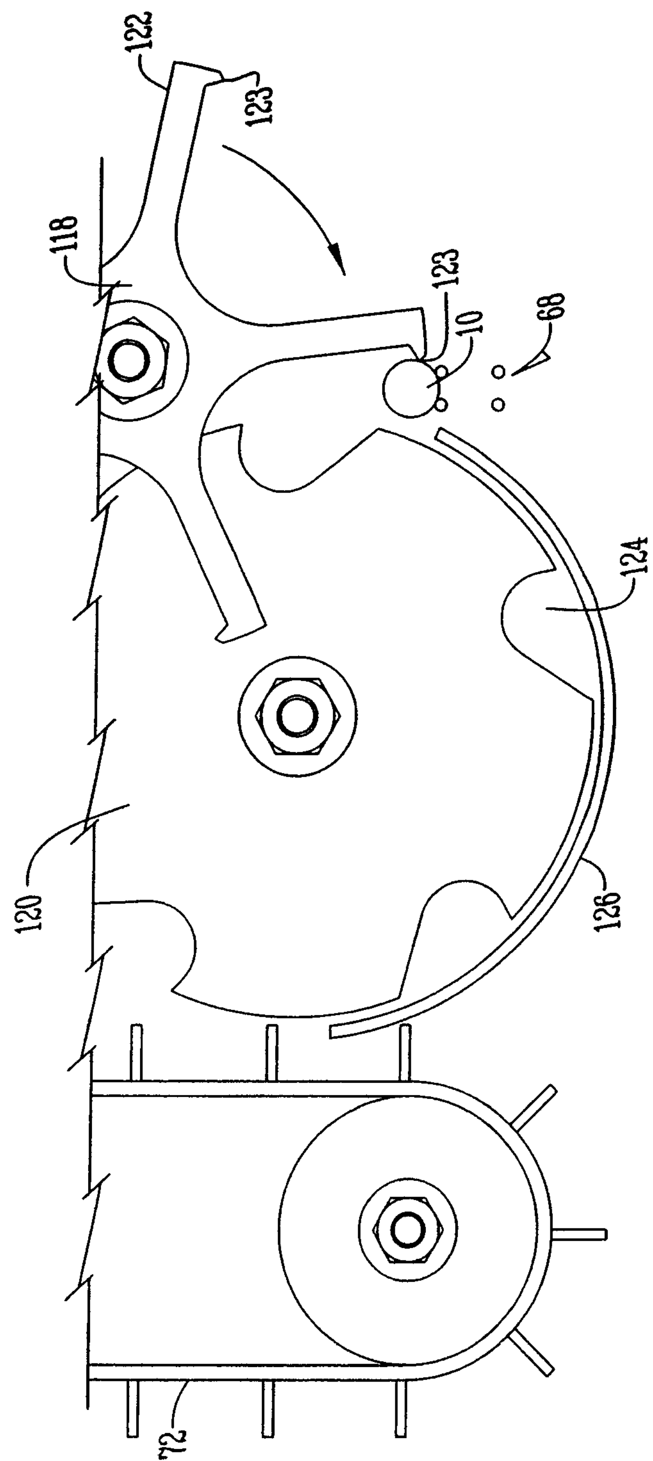
FIG. 9 is a partial side view of an orienter.
Figure 10:
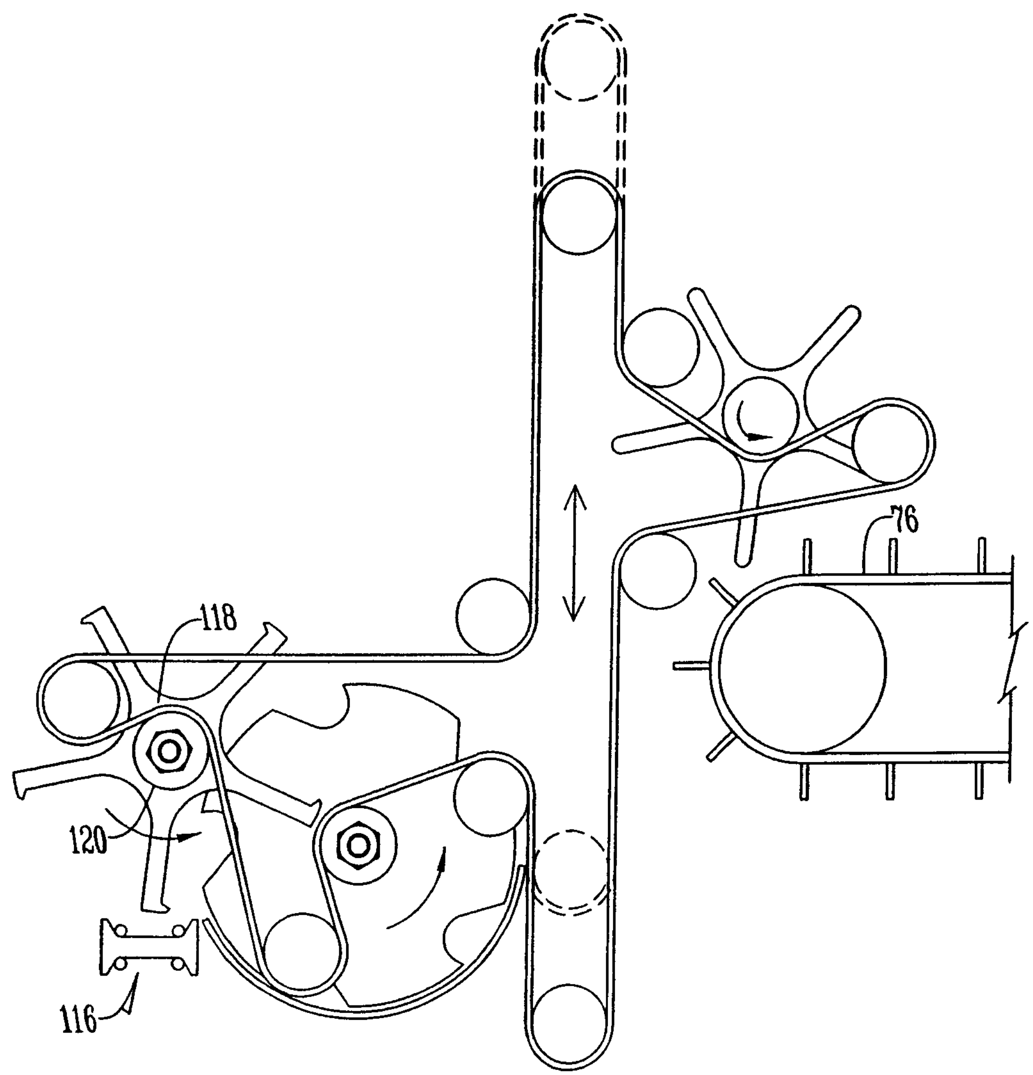
FIG. 10 is a side view of a buffer conveyor.
Figure 11:
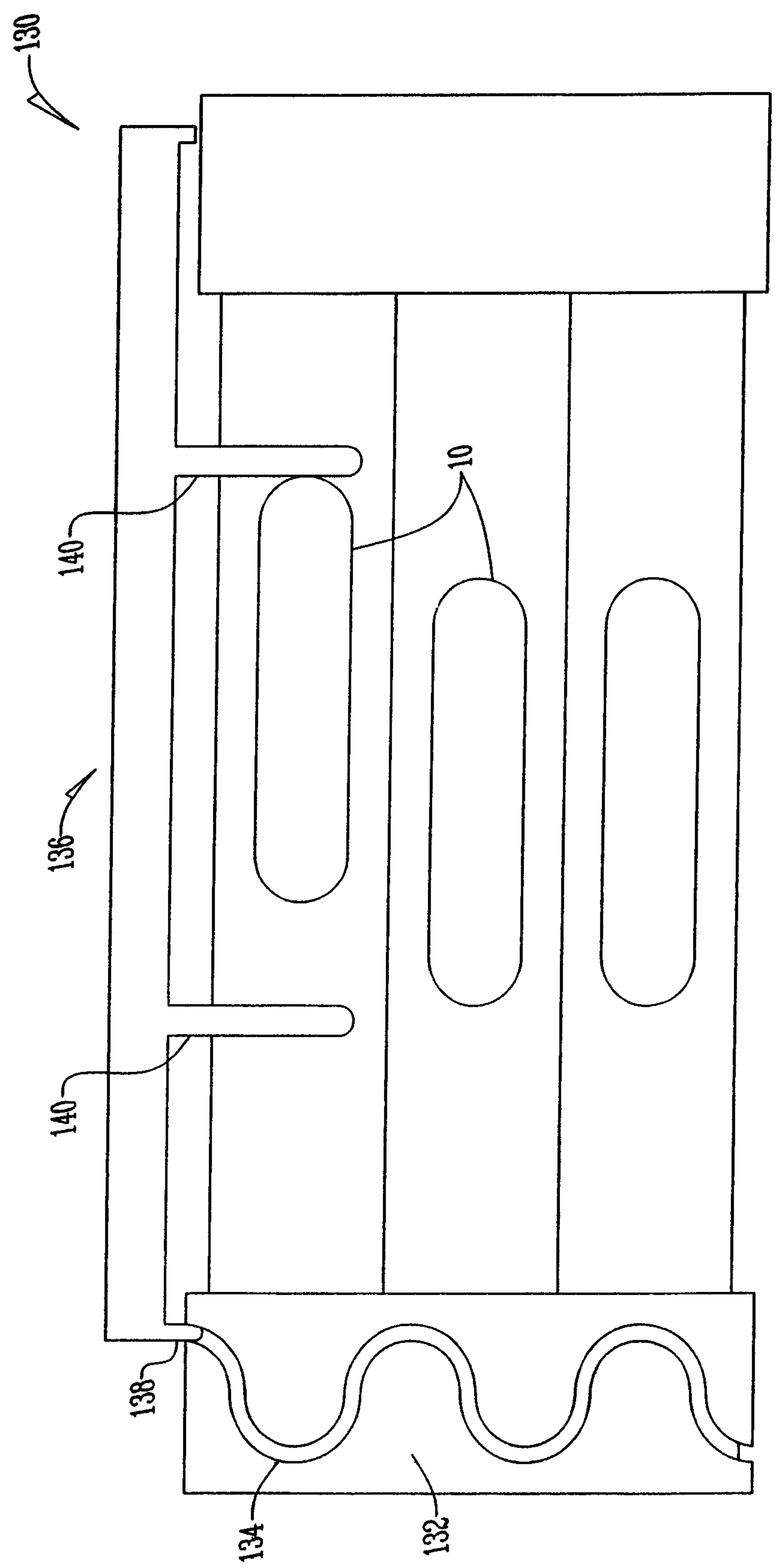
FIG. 11 is a side view of an aligning mechanism.

Food product 10 is delivered to the loading head 12 by a cooling conveyor 14. The cooling conveyor 14 has a plurality of elongated baskets 16 that extend transversely between a pair of rotating belts or chains 18. The baskets 16 are preferably about 2 meters in length and product 10, which is positioned end to end within the baskets 16, approximately 30 mm apart, are cooled via spray bars or the like. The function of the cooling conveyor 14 is to drop the surface temperature of the food product 10 from approximately 90° C. to about 55° C. which is the approximate temperature of the core of the food product 10. In some embodiments, the use of cold water spray is followed by an air knife to dry the product 10. The belts or chains 18 of the cooling conveyor 14 rotate about pulleys 20. Pivotably mounted to the shaft 22 of one pulley 20 at the distribution end of the cooling conveyor is an end guide 24.

The end guide 24 pivots from a first position where product is allowed to drop from a basket 16 through an opening 26 on the lower surface of a downstream end turn 28 to a distributor, to a second position where the end turn 28 opening 26 is closed by the end guide 24. The end guide 24 pivots from the first or open position to the second or closed position when the loading system is not to receive product such as when a jam, malfunction, or other reason exists. When the end guide 24 pivots to the second position, food product 10 is diverted to a second opening 30 in the end turn 28 where product 10 is dropped from a basket 16 to a rework conveyor 32 via a chute or the like.

The distributor 34 receives food product 10 from the baskets 16 and separates groups of food product 10 into at least two lanes. The distributor 34 operates preferably at a maximum rate of about 75 baskets per minute. A sensor 36, such as a photo eye may be positioned on the distributor 34 to sense the distribution of food product 10. In the preferred embodiment, the distributor 34 has a distribution gate 38 positioned under the first opening of the end turn. The gate 38 is rotatably mounted to a distributor frame 40 to selectively deflect a group of food product 10 to at least two drop gate assemblies 42 positioned beneath the distribution gate 38. The drop gate assemblies 42 can be of any type but preferably are V-shaped with a pair of arms 44 that are rotatably mounted to the distribution frame 40 and cross to catch and retain product. The drop gate assemblies are vertically aligned with lanes on the balancing and diverting conveyor 46 which is positioned below the distributor. Alternatively, the drop gates 42 are selectively opened to drop product into respective lanes on a Vee shaped conveyor 92 which preferably is operating at 1.5 m/second. To increase the separation of the food product 10, the drop gate 42 opens at the downstream end prior to the upstream end. The operation of the distributor 34 preferably is driven mechanically by cams that operate in conjunction with the rotation of the cooling conveyor pulleys 20. By diverting groups of food products into at least two lanes, the flow of product is slowed at least by half.

The Vee conveyor 92 transfers product to the lane balancing and diverting conveyor 46 which has at least two lanes 48, 50 that transfer food product 10 to the loading station 12. A first sensor 52 is positioned near the entry of each lane to monitor the spacing of food product within and count the amount of product in each lane. If two separate products are shingled or overlapped, the sensor transmits a signal to a controller 54 and the controller activates a diverter 56, such as an air jet, a paddle or the like, which diverts the shingled product to the rework conveyor 32. The lanes have openings 58 positioned adjacent the diverters 56 which permit the transfer of product to the rework conveyor 32. The rework conveyor 32 is positioned in spaced relation below the lane balancing and diverting conveyor 46. Additionally, the sensors 52 transmit a signal to the controller 54 for each product 10 that passes and the controller 54 compares the food product count between each lane. When the count is not equal between lanes, the controller 54 will activate the diverters 56 to transfer the desired number of food products 10 from one lane to the other to maintain an equal count.

To insure that the transfer or diversion of product did not create a shingle in the lane, a second set of sensors 60 are positioned downstream of the first diverters 56, as well as a second set of diverters 62 downstream of the second sensors 60. In this manner, when the sensor 60 detects a shingle, it transmits a signal to the controller which in turn activates the second diverter 62 to transfer product to an adjacent lane. Additionally, the second sensors 60 transmit a signal regarding the number of product that pass to the controller 54. This signal is compared to the count signal from the first sensor 52 to determine if a jam has occurred. If the exiting count is not within an acceptable amount of the entering count, a jam likely has occurred and the lane balancing and diverting conveyor 46 will automatically pivot about the axis of the head pulley 64 at the distribution end which directs product to the rework conveyor 32 to clear the jam. Likewise, the end guide 24 pivots to the second position to provide extra clearance to clear the jam. Since the distance between the lanes of product must be increased in the proper operation of equipment downstream, a traveling side guide 66 will crowd over one lane of product to provide the desired spacing before product leaves the lane balancing conveyor.

Each lane of food product is then transferred to a loading conveyor 68 which presents product to an orienter 70. Preferably, the loading conveyor 68 is a cup shaped conveyor, but could be of any type. The orienter 70 changes the direction of flow of the food product group from traveling from end to end to a side by side flow. The orienter 70 can be of any structure or type, but preferably is a three sided paddle having a rotational axis in spaced parallel relation to the loading conveyor. As the orienter 70 rotates, food product 10 is swept off the loading conveyor 68 toward a buffer conveyor 72. Optimally, the orienter 70 can process up to eight hot dogs per second. A photo sensor 74 mounted upstream from the orienter 70 sends a signal to the controller 54 which activates the orienter 70 to rotate and advance one food product to the buffer conveyor 72. The controller 54 may be set to take every product, any product, or no product.

The buffer conveyor 72 transfers product to the main conveyor 76 of the loading system 12. Because the flow of product from the orienter 70 is intermittent, the buffer conveyor 72 is shuttled vertically to accommodate intermittent loading and provide continuous unloading to the main conveyor 76. For example, as the buffer conveyor 72 moves downwardly, the distance traveled on the buffer conveyor 72 increases, as it moves upwardly, the distance traveled on the buffer conveyor 72 decreases, creating a desired buffer zone. Alternatively, as the buffer conveyor 72 moves downwardly, product is loaded onto the main conveyor reducing the amount of product in the buffer zone. As the buffer conveyor 72 moves upwardly the buffer conveyor fills with product adding to the amount of product in the buffer zone.

Movement of the buffer conveyor 72, in one embodiment, occurs as a result of the differential in movement between the transfer wheel 118 and the drop wheel 128. A belt extends around a plurality of pulleys, including the transfer and drop wheels creating a master/slave relationship. Preferably, when the rotational speed of the transfer wheel is greater than the drop wheel, the buffer conveyor 72, riding in tracks moves upwardly. When the rotational speed of the drop wheel is greater than the transfer wheel, the buffer conveyor moves downwardly.

Servo motors are used to drive the orienter 70 and the buffer conveyor 72. Optimally, the buffer conveyor 72 holds 30 food products. An orienter 70 and buffer conveyor 72 accommodate each lane of food product. The orienter 70 is constructed to allow product to flow through on the loading conveyor 68 without product being processed. Product that flows through may be transferred to a second orienter 80 for processing or to a rework container or tote 82 if the buffer conveyor 72 is full or the main conveyor 76 is stopped.

The main conveyor 76 transfers the product from the buffer conveyor 72 to the loading head 84. The loading head 84 groups and transfers food product into pockets on the packaging machine 86. If only one packaging machine 86 is used in the system and it cannot receive product because of film changes or other reasons, the product coming from the cooling conveyor 14 must be diverted to the rework conveyor 32. If the delay is expected to be longer than the time the product is in the ovens, then the extruders need to be stopped. To reduce loss the orienters 70, 80 are used to process all, any, or none of the product in a lane. With a second packaging machine 88 positioned downstream of the first packaging machine 86 the orienters 70 on the first packaging machine 86 may be idled or partially idled allowing the second packaging machine 88 to pack all or part of the product.

The rework conveyor 32 preferably operates only when product has been diverted onto it and stops after product has cleared. At the discharge end of the rework conveyor is a reclaim conveyor 90. The reclaim conveyor will hold rework product for a period of time that has been determined to be acceptable. After the time has expired, the reclaim conveyor 90 will advance product to the rework container or hopper 82. With both packaging lines in operation, an operator can shift full packaging responsibility to the first packaging machine 86, and can manually transfer product from the reclaim conveyor 90 to the loading conveyors 68 for processing by the orienters 80 to the second packaging machine 86.

In an alternative embodiment, rather than drop product 10 from the cooling conveyor 14 to the balancing and diverting conveyor 46, product 10 is dropped onto a V-conveyor 92. The V-conveyor includes a belt 93 made of single or multiple pieces that extends around a drive pulley 94 and a tensioning pulley 96. At least one roller 98 is positioned between the drive pulley 94 and the tensioning pulley 96. The roller 98 has radial edges 100 and a cut-out center portion 102. The belt 93 is supported on the edges 100 of the roller 98 such that the center of the belt 93 falls within the cut-out center portion 102. When product 10 is dropped to the belt 93, the soft center of the belt 93 absorbs the bounce of the product 10 and reduces shingles. Previously, product 10 would bounce on the belt 93 and overlap.

Product is transferred from the V-conveyor 92 to the balance and diverting conveyor 46, or, to create floor space, a bridge conveyor 104 is positioned between the V-conveyor 92 and the balance and diverting conveyor 46. In an exemplary embodiment of the balance and diverting conveyor 46 a nip roll 106 or similar device rotates at a greater speed than the delivering conveyor to pull and separate product 10.

To create the desired spacing between multiple lanes 48, 50 a spreading conveyor 108 may be used. The spreading conveyor 108 has more than one lane. One lane could be positioned at an angle to a separate lane 48 from lane 50. The spreading conveyor 108 includes a belt 110 that is used in conjunction with a roller 112 to straighten product 10 when it lands crooked on the belt 110.

In an exemplary embodiment the loading conveyor 68 includes a pair of o-rings 114 or the like that extend between a pair of pulleys. Positioned between the pulleys and adjacent the orienter 70 is a narrowing element. The narrowing element is of any shape, size and structure that is preferably the length of a food product. In one example, the narrowing element includes a pair of rollers 117 with a narrowing guide 119 therebetween. The o-rings 114 are spread in spaced relation about the pulleys and narrows at the narrowing element 116. The effect of the narrowing of the o-rings 114 is that product 10 is raised or teed up at the orienter 70 so that the product 10 will more easily and quickly come off the loading conveyor 68 when transferred to the buffer conveyor 72. In this way, product is removed from instead of exiting from the conveyor. Further, if product is not centered on the o-rings 114, the product will fall off onto the rework conveyor 32 or into a rework container 82. Also, if there is a jam or malfunction downstream, product is diverted from the o-rings 114 to a rework container 82.

In an exemplary embodiment of the orienter 70 a transfer wheel 118 that interlaces with a second wheel 120 is used to transfer product 10 from the loading conveyor 68 to the buffer conveyor 72. The transfer wheel 118 has a plurality of fingers 122 and preferably five. The fingers 122 are of any size and shape but are preferably thin so that subsequent product 10 on the loading conveyor 68 do not hit the fingers 122. In one example, the fingers have a sharp point 123 that indents the product 10 to stop movement along the loading conveyor 68. The shape of the fingers 122 can be adjusted in relation to the rotational axis of the transfer wheel 118 to change the trajectory that product 10 is swept off of the loading conveyor. The transfer wheel 118 is easily removable so that other wheels may be installed to accommodate product 10 of different sizes.

The second wheel 120 has a plurality of slots 124 that receive product 10 from the transfer wheel 118 and in conjunction with an end guide 126 trap the product 10 within the slots 124. Through cooperation with the fingers 122 of the transfer wheel 118 product is quickly trapped within the slots 124 eliminating the need for a guide rail. This in turn shortens transfer time and increases reliability. As the second wheel 120 rotates product is transferred from a slot 124 to the buffer conveyor 72 by centrifugal force when the slot 124 is positioned beyond the end guide 126.

If there is a jam or malfunction downstream, the transfer wheel 118 will pivot upwardly via an air cylinder so that product may flow through on the loading conveyor 68. Also, if the transfer wheel 118 is not at its home position (i.e., position to receive product) a signal is sent to the controller 54 to close the end turn 24 on the cooling conveyor 14 to divert product to the rework conveyor 32.

The buffer conveyor 72 preferably rotates to transfer product over the top and has a drop wheel 128 positioned on the opposite side of the buffer conveyor 72 from the second wheel 120. Mounted adjacent the top of the buffer conveyor 72 is an alignment mechanism 130. The alignment mechanism 130 has at least one drive wheel 132 that has a cam slot 134 cut into the outer periphery of the wheel 132. A guide member 136 extends from the drive wheel 132 and over the buffer conveyor 72. The guide member 136 has at least one cam follower 138 that is positioned and formed to be received within the cam slot 134. Extending outwardly from the guide member 136 are a pair of paddles 140 that are separated slightly more than the length of the food product 10 and positioned to engage food product on the buffer conveyor 72. In operation as the drive wheel 132 rotates the cam follower 138 follows the shape of the cam slot 134 which preferably is zigzagged shaped. As the cam follower 138 follows the zigzag path of the cam slot 134 the guide member 136 moves back and forth toward and away from the drive wheel 132. As the guide member 136 moves back and forth the paddles 140 alternately engage the ends of the food product 10 until the food product 10 is aligned on the buffer conveyor.

Therefore, an apparatus and method for transporting food product has been disclosed that, at the very least meets all the stated objectives.

What is claimed is:

1. An alignment mechanism, comprising at least one drive wheel having a cam slot formed within the outer periphery of the wheel; and a guide member having at least one cam follower formed to be received within the cam slot and a pair of paddles that extend outwardly from the guide member.

2. The alignment mechanism of claim 1 wherein the cam follower follows a shape of the cam slot formed within the outer perimeter of the drive wheel as the drive wheel rotates.

3. The alignment mechanism of claim 1 wherein the guide member extends from the drive wheel outwardly over a conveyor.

4. The alignment mechanism of claim 3 wherein the paddles are positioned to engage food products on the conveyor.

5. The alignment mechanism of claim 4 wherein the paddles are separated by a length which is greater than a length of the food products.

6. The alignment mechanism of claim 3 wherein the guide member moves toward and away from the drive wheel as the cam follower follows the shape of the cam slot.

7. The alignment mechanism of claim 6 wherein the paddles alternately engage ends of a food product as the cam follower follows the shape of the cam slot and the guide member moves toward and away from the drive wheel.

8. The alignment mechanism of claim 1 wherein the guide member extends outwardly from the drive wheel the at least one cam follower and the guide member is connected to the at least one cam follower.

9. An alignment mechanism, comprising at least one drive wheel having a cam slot adjacent to a conveyor;

a guide member extending from the drive wheel over the conveyor and having a pair of paddles that extend outwardly from the guide member; and wherein the guide member is connected to at least one cam follower which is received within the cam slot such that the cam follower follows a path of the cam slot formed within the outer periphery of the drive wheel and the guide member moves toward and away from the drive wheel over the conveyor as the drive wheel rotates.

10. The alignment mechanism of claim 9 wherein the paddles are positioned to engage food products on the conveyor.

11. The alignment mechanism of claim 10 wherein the paddles are separated by a length which is greater than a length of the food products.

12. The alignment mechanism of claim 11 wherein the paddles alternately engage ends of a food product as the cam follower follows the path of the cam slot and the guide member moves toward and away from the drive wheel.

13. The alignment mechanism of claim 9 wherein the path of the cam slot is zigzagged such that the cam follower follows a zigzagged path.

* * * * *